United States Patent
Jayapandy et al.

(10) Patent No.: US 11,604,642 B2
(45) Date of Patent: Mar. 14, 2023

(54) SYSTEM FOR COMPUTER PROGRAM CODE ISSUE DETECTION AND RESOLUTION USING AN AUTOMATED PROGRESSIVE CODE QUALITY ENGINE

(71) Applicant: BANK OF AMERICA CORPORATION, Charlotte, NC (US)

(72) Inventors: Andrews Jayapandy, Tamil Nadau (IN); Prakash Koshti, Telangana (IN); Manan Rastogi, Chandanagar (IN); Amol Jaiswal, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 14 days.

(21) Appl. No.: 17/140,423

(22) Filed: Jan. 4, 2021

(65) Prior Publication Data

US 2022/0214874 A1    Jul. 7, 2022

(51) Int. Cl.
*G06F 8/77* (2018.01)
*G06F 8/75* (2018.01)
*G06N 20/00* (2019.01)
*G06N 5/04* (2023.01)

(52) U.S. Cl.
CPC ............ *G06F 8/77* (2013.01); *G06N 5/04* (2013.01); *G06N 20/00* (2019.01)

(58) Field of Classification Search
CPC .... G06F 8/77; G06F 8/75; G06N 5/04; G06N 20/00
See application file for complete search history.

(56) References Cited

U.S. PATENT DOCUMENTS

| | | |
|---|---|---|
| 7,594,143 B2 | 9/2009 | Chin et al. |
| 8,291,319 B2 | 10/2012 | Li et al. |
| 8,479,161 B2 | 7/2013 | Weigert |
| 8,499,204 B2 | 7/2013 | Lovy et al. |
| 8,504,994 B2 | 8/2013 | Golender et al. |
| 8,799,829 B2 | 8/2014 | Grosz et al. |
| 8,931,101 B2 | 1/2015 | Baluda et al. |
| 9,038,026 B2 | 5/2015 | Chandra et al. |
| 9,081,988 B2 | 7/2015 | Dolev |
| 9,189,233 B2 | 11/2015 | Sasanka et al. |
| 9,734,169 B2 | 8/2017 | Redlich et al. |
| 9,956,490 B2 | 5/2018 | Perlman et al. |
| 10,291,635 B2 | 5/2019 | Muddu et al. |
| 10,339,309 B1* | 7/2019 | Kling ................. G06F 16/9024 |

(Continued)

*Primary Examiner* — Daxin Wu
(74) *Attorney, Agent, or Firm* — Moore & Van Allen PLLC; Seongun M. Hong

(57) ABSTRACT

A system is provided for computer program code issue detection and resolution using an automated progressive code quality engine. In particular, the system may automatically detect issues with computer program code automatically resolve the issues detected on any computing system within a network environment. The system may comprise a progressive code quality engine configured to use machine learning algorithms to adaptively detect code quality issues and a rule imposition engine that automatically resolves the issues detected by the code quality engine. The system may further comprise one or more edge device-based quality enablers that may coordinate the resolution of code quality issues with a cloud-based master controller. In this way, the system provides a seamless and dynamic end-to-end solution for addressing code quality issues.

17 Claims, 3 Drawing Sheets

(56) References Cited

U.S. PATENT DOCUMENTS

| | | | |
|---|---|---|---|
| 10,474,559 B2 | 11/2019 | Moorthi et al. | |
| 10,474,992 B2 | 11/2019 | Fisher et al. | |
| 10,659,422 B2 | 5/2020 | Yu et al. | |
| 10,725,755 B2 | 7/2020 | Sager et al. | |
| 10,817,604 B1* | 10/2020 | Kimball | G06F 8/73 |
| 10,869,253 B2 | 12/2020 | Barak et al. | |
| 10,949,338 B1* | 3/2021 | Sirianni | G06N 20/20 |
| 2010/0241469 A1* | 9/2010 | Weigert | G06F 11/3604 |
| | | | 717/124 |
| 2010/0287027 A1* | 11/2010 | Jacobs | G06Q 30/0207 |
| | | | 705/14.1 |
| 2011/0247071 A1* | 10/2011 | Hooks | G06F 21/567 |
| | | | 726/22 |
| 2017/0212829 A1* | 7/2017 | Bales | G06N 3/0454 |
| 2018/0196731 A1* | 7/2018 | Moorthi | G06F 8/71 |
| 2018/0316715 A1* | 11/2018 | Liu | H04L 63/1466 |
| 2018/0374022 A1* | 12/2018 | Wang | H04N 5/33 |
| 2019/0050445 A1 | 2/2019 | Griffith et al. | |
| 2020/0167787 A1* | 5/2020 | Kursun | H04L 67/22 |
| 2020/0293946 A1* | 9/2020 | Sachan | G06N 5/04 |
| 2020/0401607 A1 | 12/2020 | Chan et al. | |
| 2021/0157665 A1* | 5/2021 | Rallapalli | G06F 11/3068 |
| 2021/0216442 A1* | 7/2021 | Bhadani | G06F 11/3692 |

\* cited by examiner

SYSTEM FOR COMPUTER PROGRAM CODE ISSUE DETECTION AND RESOLUTION USING AN AUTOMATED PROGRESSIVE CODE QUALITY ENGINE

FIELD OF THE INVENTION

The present disclosure embraces a system for computer program code issue detection and resolution using an automated progressive code quality engine.

BACKGROUND

There is a need for a more efficient and effective way to detect and resolve issues with computer program code.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for computer program code issue detection and resolution using an automated progressive code quality engine. In particular, the system may automatically detect issues with computer program code automatically resolve the issues detected on any computing system within a network environment. The system may comprise a progressive code quality engine configured to use machine learning algorithms to adaptively detect code quality issues and a rule imposition engine that automatically resolves the issues detected by the code quality engine. The system may further comprise one or more edge device-based quality enablers that may coordinate the resolution of code quality issues with a cloud-based master controller. In this way, the system provides a seamless and dynamic end-to-end solution for addressing code quality issues.

Accordingly, embodiments of the present disclosure provide a system for computer program code issue detection and resolution using an automated progressive code quality engine. The system may comprise a memory device with computer-readable program code stored thereon; a communication device; and a processing device operatively coupled to the memory device and the communication device, wherein the processing device is configured to execute the computer-readable program code to detect, using a code quality bot, that a set of source code is ready for analysis; receive, from one or more edge devices, the set of source code and metadata associated with the set of source code; store the set of source code and metadata associated with the set of source code within a compartmentalized raw code database; perform, using an adaptive quality engine, quality pattern analysis on the set of source code; based on the quality pattern analysis, detect one or more code quality issues within the set of source code; and automatically implement, using a rule imposition engine, one or more resolution steps to remedy the one or more code quality issues within the set of source code.

In some embodiments, the code quality bot aggregates, from one or more computing systems, one or more source code files to form the set of source code.

In some embodiments, the metadata associated with the set of source code comprises a user ID, a system ID, and a project ID for each of the one or more source code files within the set of source code.

In some embodiments, the quality pattern analysis comprises one or more machine learning algorithms, wherein the adaptive quality engine provides one or more code quality rules as inputs to the one or more machine learning algorithms.

In some embodiments, the one or more machine learning algorithms comprises at least one of a classification algorithm and a probabilistic algorithm.

In some embodiments, the computer-readable program code further causes the processing device to identify, based on the metadata associated with the set of source code, one or more users associated with the one or more code quality issues; and transmit, to the one or more users, a notification comprising the one or more code quality issues and the one or more resolution steps.

In some embodiments, the one or more quality issues comprise at least one of formatting issues, performance issues, and test coverage issues.

Embodiments of the present disclosure also provide a computer program product for computer program code issue detection and resolution using an automated progressive code quality engine, the computer program product comprising at least one non-transitory computer readable medium having computer-readable program code portions embodied therein. The computer-readable program code portions may comprise executable code portions for detecting, using a code quality bot, that a set of source code is ready for analysis; receiving, from one or more edge devices, the set of source code and metadata associated with the set of source code; storing the set of source code and metadata associated with the set of source code within a compartmentalized raw code database; performing, using an adaptive quality engine, quality pattern analysis on the set of source code; based on the quality pattern analysis, detecting one or more code quality issues within the set of source code; and automatically implementing, using a rule imposition engine, one or more resolution steps to remedy the one or more code quality issues within the set of source code.

In some embodiments, the code quality bot aggregates, from one or more computing systems, one or more source code files to form the set of source code.

In some embodiments, the metadata associated with the set of source code comprises a user ID, a system ID, and a project ID for each of the one or more source code files within the set of source code.

In some embodiments, the quality pattern analysis comprises one or more machine learning algorithms, wherein the adaptive quality engine provides one or more code quality rules as inputs to the one or more machine learning algorithms.

In some embodiments, the one or more machine learning algorithms comprises at least one of a classification algorithm and a probabilistic algorithm.

In some embodiments, the computer-readable program code portions further comprise executable code portions for: identifying, based on the metadata associated with the set of source code, one or more users associated with the one or more code quality issues; and transmitting, to the one or more users, a notification comprising the one or more code quality issues and the one or more resolution steps.

Embodiments of the present disclosure also provide a computer-implemented method for computer program code issue detection and resolution using an automated progressive code quality engine, wherein the method comprises detecting, using a code quality bot, that a set of source code is ready for analysis; receiving, from one or more edge devices, the set of source code and metadata associated with the set of source code; storing the set of source code and metadata associated with the set of source code within a compartmentalized raw code database; performing, using an adaptive quality engine, quality pattern analysis on the set of source code; based on the quality pattern analysis, detecting one or more code quality issues within the set of source code; and automatically implementing, using a rule imposition engine, one or more resolution steps to remedy the one or more code quality issues within the set of source code.

In some embodiments, the code quality bot aggregates, from one or more computing systems, one or more source code files to form the set of source code.

In some embodiments, the metadata associated with the set of source code comprises a user ID, a system ID, and a project ID for each of the one or more source code files within the set of source code.

In some embodiments, the quality pattern analysis comprises one or more machine learning algorithms, wherein the adaptive quality engine provides one or more code quality rules as inputs to the one or more machine learning algorithms.

In some embodiments, the one or more machine learning algorithms comprises at least one of a classification algorithm and a probabilistic algorithm.

In some embodiments, the method further comprises identifying, based on the metadata associated with the set of source code, one or more users associated with the one or more code quality issues; and transmitting, to the one or more users, a notification comprising the one or more code quality issues and the one or more resolution steps.

In some embodiments, the one or more quality issues comprise at least one of formatting issues, performance issues, and test coverage issues.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
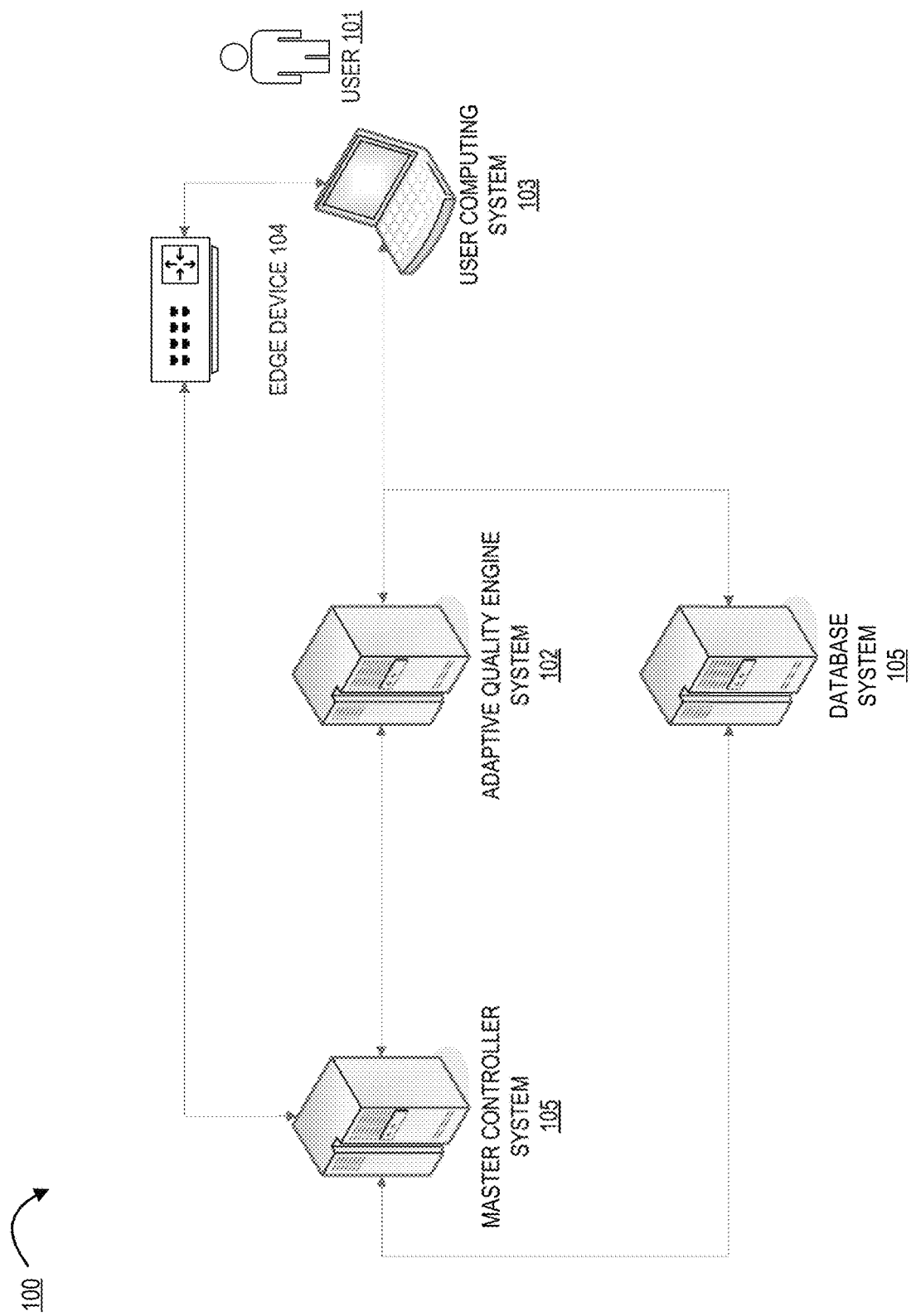
Figure 2:
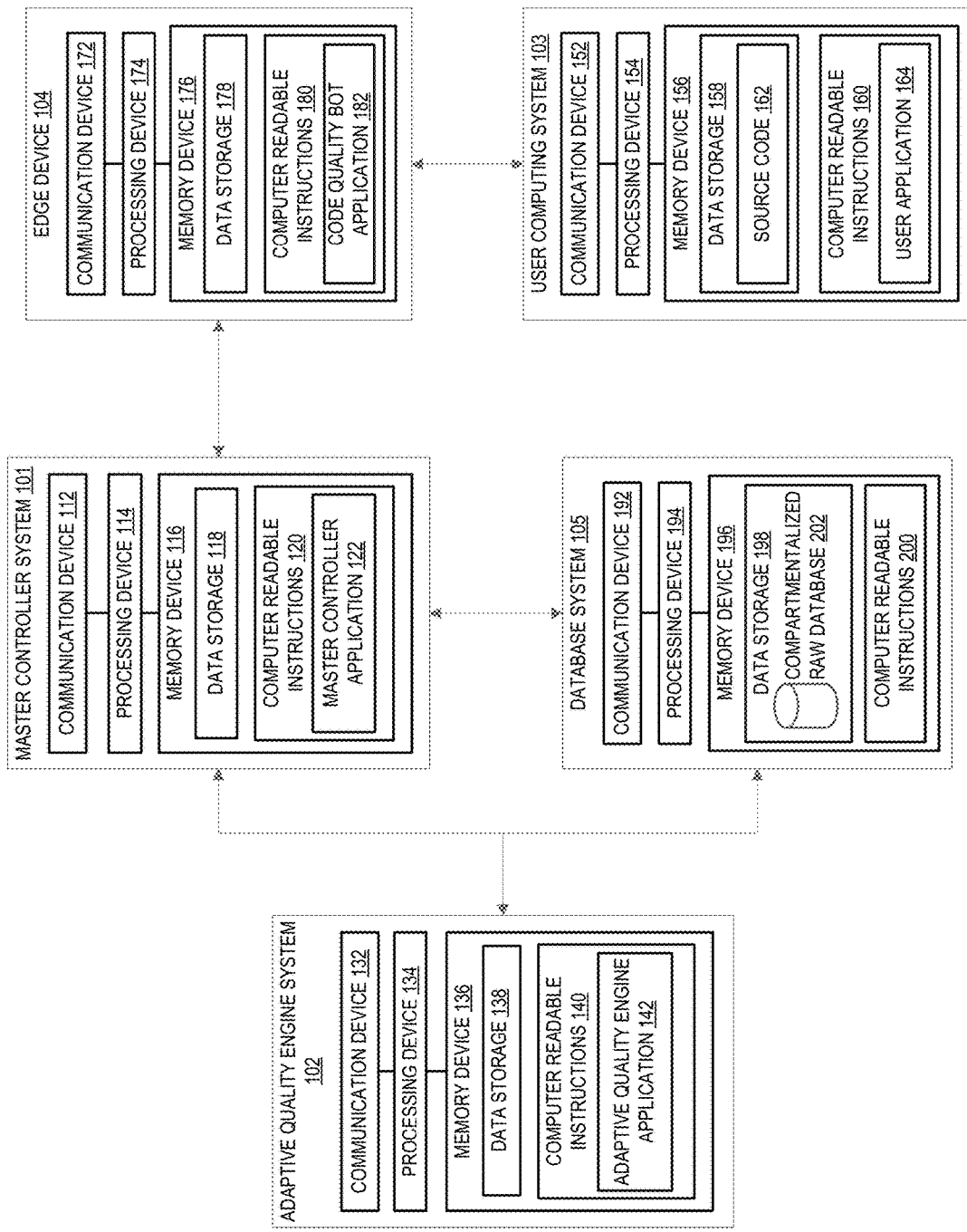
Figure 3:
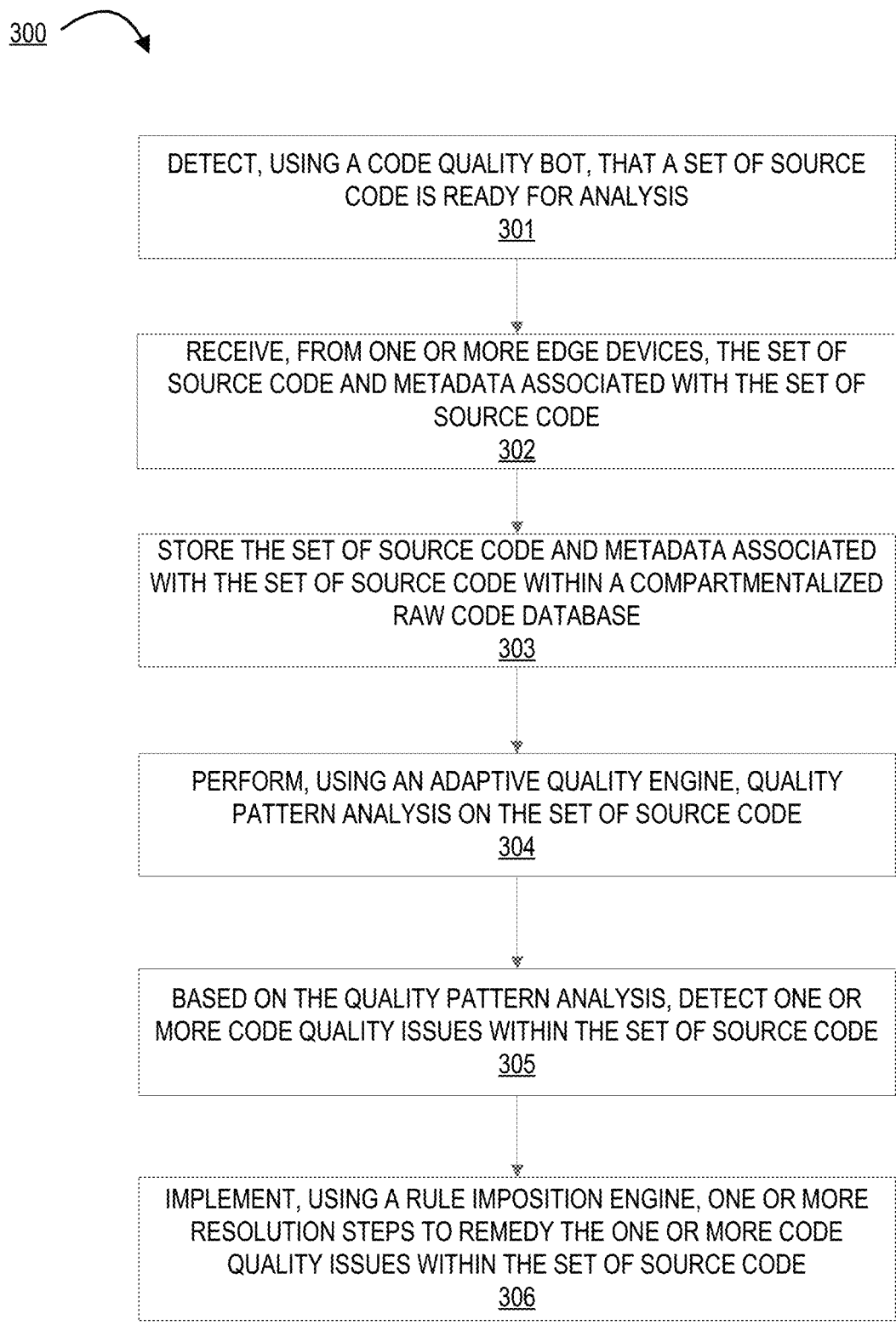

Having thus described embodiments of the invention in general terms, reference will now be made to the accompanying drawings, wherein:

FIG. 1 illustrates an operating environment for the code quality resolution system, in accordance with one embodiment of the present disclosure;

FIG. 2 illustrates the systems and devices within the operating environment in more detail, in accordance with one embodiment of the present disclosure; and FIG. 3 illustrates a process flow for dynamically detecting and resolving computer code quality issues using a progressive code quality engine, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity, or a third party who is not related to the entity.

Accordingly, the term "user device" or "mobile device" may refer to mobile phones, personal computing devices, tablet computers, wearable devices, and/or any stationary or portable electronic device capable of receiving and/or storing data therein.

"Edge device" as used herein may refer to a networked device that serves as an entry point to a network to one or more computing systems. Accordingly, in some embodiments, an edge device may be a networking router, switch, hub, or the like. In other embodiments, "edge device" may also refer to a standalone computing system which may be connected to other computing systems within the network. In such embodiments, the edge device may be any type of computing system as described herein, which in some embodiments may be operated by a user (e.g., a software developer within the entity).

"Natural language processing" or "NLP" as used herein may refer to artificial intelligence technology that may allow computing devices to process and analyze language data. "Natural language understanding" or "NLU" as used herein may refer to the process by which a computing device (e.g., a device with NLP functionality) understands or comprehends natural language.

In the context of software development, particularly in the enterprise environment, an entity may face technical challenges in maintaining code quality. For example, code within the network may be written by different users (e.g., developers) within the network who may be involved in various coding projects, be members of different organizational units, or the like. Accordingly, the development process may give rise to code quality issues relating to code consistency, readability, formatting, syntax, typographical errors, performance optimization, test coverage, compliance with project-specific and/or organization-specific rules or standards, or the like. Furthermore, the effects of code quality issues may be more significant as project size increases and/or as new technologies are introduced into the development process.

To address the foregoing technical challenges among others, the system as described herein provides a way to intelligently detect code quality issues and dynamically resolve such code quality issues independently of any particular technology platform or programming language without the need for user intervention. Accordingly, the system may comprise an adaptive quality engine that uses a quality pattern analyzer algorithm to analyze computer code for various types of quality issues as described above. For instance, an organization within the entity may wish to enforce certain rules or standards regarding the formatting of source code (e.g., an indentation standard for improving code readability). The pattern analyzer algorithm may be used by the system to detect the outstanding issues and automatically implement the solution (e.g., perform reformatting of the source code) by activating a rule imposition engine that may be installed on one or more edge devices and/or user computing systems within the network environment. In this way, the system may provide a seamless way to improve code quality on the enterprise or organizational level as well as the individual level.

Turning now to the figures, FIG. 1 illustrates an operating environment 100 for the code quality resolution system, in accordance with one embodiment of the present disclosure. The operating environment 100 may comprise a user computing system 103, edge device 104, master controller system 105, adaptive quality engine system 102, and database system 105 in operative communication with one another over a network. The one or more user computing systems 103 may be operated by one or more users 101 for the purposes of code development. The user 101 may be, for instance, a software developer who may be developing code for an entity and/or an organization within the entity. According, the user computing system 103 may be a computing system such as a desktop computer, laptop computer, distributed computing client device, or the like.

Each of the one or more user computing systems 103 may be communicatively coupled to one or more edge devices 104. In some embodiments, the edge device 104 may be a networking device such as a router, switch, server, or the like which may serve as an entry point for the user computing system 103. Each edge device 103 may have a code quality bot stored thereon, where the code quality bot may be configured to receive requests from the user computing system 103 to analyze a set of code for quality issues (which may be referred to herein as "quality analysis requests"). In this regard, once the user 101 has signaled that a set of code has been completed (e.g., by flagging the code via a user interface presented on the user computing system 103), the user computing system 103 may transmit, to the edge device 104, a copy of the source code along with metadata associated with the code (which may be referred to herein as "code metadata"), such as a user name, user ID, hardware or machine ID of the user computing system 103, programming language or platform used, or the like. In some embodiments, a code quality bot may also (or alternatively) be stored on each of the user computing systems 103 within the network.

The number of instantiated code quality bots may be dynamically adjusted by load balancing performed by the system according to the needs of the project and/or the entity. For example, if a particular organization within the entity has added a number of developers to a particular project, the system may allocate additional bots to the particular organization and/or project. In other embodiments, the load balancing may be implemented on a time-dependent basis. For instance, if a particular month of the year is particularly active in terms of code development, additional bots may be instantiated to address the increased amounts of code to be analyzed.

The edge device 104 may also be communicatively coupled to a master controller system 105. The master controller system 105 may be a cloud-based master controller that may coordinate the analysis checking, standardization, and/or code quality issue resolution processes of the system at the individual level, organizational level, and/or entity level. In particular, the master controller system 105 may allocate and/or apportion the resources of the adaptive quality engine system 102 when analyzing code received from various user computing systems 103 and/or edge devices 104. In this regard, the master controller system 105 may perform the load balancing processes as described above. Once the edge device 104 has aggregated the quality analysis requests from the one or more user computing systems 103, the edge device 104 may transmit the quality analysis requests to the master controller system 105.

The master controller system 105 may then store the data and metadata associated with the quality analysis requests (e.g., the source code, code metadata, and the like) within the database system 105. The database system 105 may, in some embodiments, be a compartmentalized relational database containing tables of raw (or unprocessed) data and metadata regarding the code to be analyzed. In this regard, the master controller system 105 may store and group the code data and metadata from the edge devices 104 according to common characteristics (e.g., by organization, team, project, user, or the like). In this way, the system may be able to detect code quality issues and implement quality rules at various different levels.

Once the code data and metadata are stored in the database system 105, the adaptive quality engine system 102 may pull the code data and metadata from the relevant compartments of the database system 105 for analysis. In this regard, the adaptive quality engine system 102 may comprise a self-progressing adaptive quality engine which may be configured to detect code quality issues as they arise within the computing systems in the network embodiment. In particular, the adaptive quality engine may use a machine learning-based code quality pattern analyzer algorithm to analyze a set of code and detect issues within the set of code. In some embodiments, the adaptive quality engine system 102 may use supervised learning algorithms to perform pattern analysis of the code, where the inputs to the supervised learning algorithms may be the various rules and/or standards regarding code quality that may be designated by the entity, organizations, teams, or the like.

Accordingly, in such embodiments, the pattern analyzer algorithm may comprise a classification algorithm such as a k-nearest neighbors ("k-NN") algorithm, through which the adaptive quality engine system 102 performs clustering and/or classification of the code data and/or metadata. In one embodiment, the adaptive quality engine system 102 may perform clustering on a per-user basis. By performing the k-NN analysis, the system may be able to detect anomalies in the code data. In some embodiments, the pattern analyzer algorithm may further comprise a probabilistic algorithm such as a Naïve Bayes algorithm to use probabilistic models to categorize the anomalies as detected by the k-NN classification. For example, the system may detect that a particular anomaly is likely an indentation error caused by a certain user as discovered within the code data. In other embodiments, the adaptive quality engine system 102 may also use unsupervised learning on the code to identify additional rules or standards.

Once the code quality issues have been identified by the adaptive quality engine system 102, the adaptive quality engine system 102 may transmit a report containing the results of the analysis to the master controller system 105. In some embodiments, the adaptive quality engine system 102 may store the report within the database system 105 with a reference to the code analyzed by the adaptive quality engine system 102, such that the master controller system 105 may detect and pull the report from the database system 105.

Upon receiving the report, the master controller system 105 may then transmit a commit operation signal to the edge device 104, where the commit operation signal causes the rule imposition engine of the code quality bot to automatically implement one or more resolutions to the code quality issues. In this regard, the commit operation signal may comprise a list of commands to execute in order to remedy the code quality issues. For instance, if one of the detected code quality issues is duplication of code, the list of commands may comprise a command to delete one or more duplicate entries within the code. In some embodiments, the system may further be configured to transmit a notification to the user computing system 103 of a user 101 whose code was analyzed and corrected by the code quality bot. For example, the system may transmit an e-mail message to the user 101 which may contain a report of the issues corrected by the code quality bot.

It should be understood that FIG. 1 illustrates only an exemplary embodiment of the operating environment 100, and it will be appreciated that one or more functions of the systems, devices, or servers as depicted in FIG. 1 may be combined into a single system, device, or server (e.g., in some embodiments, the rule imposition engine and/or quality pattern analyzer algorithm may be executed by the user computing system 103 itself). To give another example, though the database system 105 and the master controller system 101 are depicted as separate computing systems, in some embodiments, the code data and metadata may be stored within the master controller system 101. Furthermore, a single system, device, or server as depicted in FIG. 1 may represent multiple systems, devices, or servers. For instance, though the user computing system 103 is depicted as a single unit, the operating environment 100 may comprise multiple different user computing systems 103 operated by multiple different users (e.g., developers within a particular team, organization, or project) which may be connected to one or more edge devices 104.

The system as described herein confers a number of technological advantages over conventional systems with respect to code quality. For instance, by implementing a framework for automatically identifying and remedying code quality issues, the system provides a seamless end-to-end solution for ensuring that developing code conforms to code quality standards at all levels within the entity. Furthermore, by using the machine learning algorithms (e.g., NLP algorithms) as described herein, the system may detect and resolve code quality issues in a technology platform and/or programming language-independent manner.

FIG. 2 illustrates the master controller system 101, adaptive quality engine system 102, user computing system 103, edge device 104, and the database system 105 in more detail, in accordance with one embodiment of the present disclosure. The master controller system 101, adaptive quality engine system 102, user computing system 103, edge device 104, and/or the database system 105 may be in operative communication with one another over a network.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

The master controller system 101 may comprise a communication device 112, a processing device 114, and a memory device 116. The master controller system 101 may be a device such as a networked server, desktop computer, terminal, or any other type of computing system as described herein. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 of the master controller system 101 may be operatively coupled to the communication device 112 and the memory device 116, where the processing device 114 may use the communication device 112 to communicate with the network and other devices on the network, such as, but not limited to the adaptive quality engine system 102, edge device 104, and/or the database system 105. Accordingly, the communication device 112 generally comprises a modem, antennae, WiFi or Ethernet adapter, radio transceiver, or other device for communicating with other devices on the network.

The memory device 116 of the master controller system 101 may have computer-readable instructions 120 stored thereon, which in one embodiment includes the computer-readable instructions 120 of a master controller application 122 which performs the code data and metadata storage, load balancing, and coordination of code quality analysis and resolution as described elsewhere herein. In some embodiments, the memory device 116 further comprises data storage 118 for storing data related to the system environment. In this regard, the data storage 118 may temporarily store code data received from the edge device 104 and/or code quality analysis reports from the adaptive quality engine system 102 and/or the database system 105.

The master controller application 122 may comprise computer-executable program code which may instruct the processing device 114 to perform certain logic, data processing, and data storing functions of the application to accomplish the entity's objectives. For instance, the master controller application 122 may be configured to receive quality analysis requests from the edge device 104 and store the associated code data and metadata within the database system 105 for analysis by the adaptive quality engine system 102. The master controller application 122 may further cause the edge device 104 to implement one or more resolutions to the code quality issues identified in the report from the adaptive quality engine system 102.

The adaptive quality engine system 102 may comprise a processing device 134 operatively coupled to a communication device 132 and a memory device 136 having data storage 138 and computer readable instructions 140 stored thereon. The adaptive quality engine system 102 may be a server or other computing system that performs the machine-learning algorithm-based pattern analysis of code as described elsewhere herein. Accordingly, the computer readable instructions 140 of the adaptive quality engine system 102 may comprise an adaptive quality engine application 142, which may comprise executable code for one or more machine learning algorithms (e.g., k-NN algorithms, Naïve Bayes algorithms, and the like) which may be used to analyze the code data as received from the edge device 104.

As further illustrated in FIG. 2, the user computing system 103 may be a computing system that is operated by a user such as a developer within a particular organization or team within the entity. Accordingly, the user computing system 103 may be a device such as a desktop computer, laptop, IoT device, smartphone, tablet, single-board computer, or the like. In this regard, the user computing system 103 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The user computing system 103 may comprise a processing device 154 operatively coupled to a communication device 152 and a memory device 156 having data storage 158 and computer readable instructions 160 stored thereon. The data storage 158 may comprise source code 162 for an application or a component of the application which is to be checked for code quality by the system described herein. Accordingly, the source code 162 may be transmitted (along with code metadata) to the edge device 104 to be transmitted to the master controller system 101 for further processing. The computer readable instructions 160 may comprise a user application 164 which may receive inputs from the user 101 and produce outputs to the user 101. In particular, the user application 144 may comprise a source code editor through which the user 101 may modify the source code 162 (e.g., add code, create UPT tags, or the like). The user application 164 may further comprise an interactive application that allows the user to signal to the edge device 104 and/or the master controller system 101 that the source code 162 is ready for quality analysis.

The edge device 104 may be a computing system that serves as a network entry point for one or more user computing systems 103 within the network embodiment. In particular, the edge device 104 may aggregate code data and metadata received from the user computing systems 103 and transmit the code data and metadata to the master controller system 101 for storage and analysis. Accordingly, the edge device 104 may comprise a processing device 174 operatively coupled to a communication device 172 and a memory device 176 having data storage 178 and computer readable instructions 180 stored there. The computer readable instructions 180 may comprise a code quality bot application 182 which may perform the aggregation of the code for subsequent analysis. The code quality bot application 182 may further comprise a rule imposition engine which may, based on being triggered by the master controller system 101, implement one or more modifications to the source code 162 within the user computing system 103 to remedy one or more issues with the source code 162 as identified by the adaptive quality engine system 102.

The database system 105 may store the raw code data along with code metadata (e.g., in a relational database). Accordingly, the database system 105 may be a server that is connected to the master controller system 101 and/or the adaptive quality engine system 102. The database system 105 may comprise a processing device operatively coupled to a communication device 192 and a memory device 196 having data storage 198 and computer readable instructions 200 stored thereon. The data storage 198 of the database system 105 may comprise a compartmentalized raw database 202, which in some embodiments be a relational database that may store the source code to be analyzed (e.g., the source code 162 of the user computing system 103) along with code metadata associated with the source code (e.g., the user ID of the user computing system 103, a hardware or system ID of the user computing system 103, the organizations or projects with which the user is associated, and the like). The source code may be stored within the compartmentalized raw database 202 by the master controller system 101 and may be pulled for analysis by the adaptive quality engine system 102.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random-Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 3 illustrates a process flow 300 for dynamically detecting and resolving computer code quality issues using a progressive code quality engine. The process may begin at block 301, where the system detects, using a code quality bot, that a set of source code is ready for analysis. In some embodiments, the code quality bot may be hosted on an edge device that may be connected to multiple user computing systems within the network environment. Each of the user computing systems may be used by a user (e.g., a developer) to write source code. In such embodiments, the user may access a user interface through which the user may, through an interface element (e.g., radio button, check box, drop down menu, clickable or interactable button, or the like), mark the source code as complete. Accordingly, upon detecting that the source code has been marked complete by the user, the system may determine that the source code is ready for code quality analysis.

The process continues to block 302, where the system receives, from one or more edge devices, the set of source code and metadata associated with the set of source code. The code quality bot may aggregate a number of source code files from the user computing systems to which the edge device is connected, where the number may depend on the load balancing settings as determined by the master controller. In some embodiments, the code quality bot may further aggregate code metadata regarding the source code files, such as the user ID, hardware or system ID, project ID, or other types of information associated with each source code file. Once the code quality bot has aggregated the source code files into a set of source code, the code quality bot may transmit the set of source code, along with associated code metadata, to the master controller for further processing.

The process continues to block 303, where the system stores the set of source code and metadata associated with the set of source code within a compartmentalized raw code database. The raw code database may be, for example, a relational database that compartmentalizes source code according to the code metadata. For instance, source code may be grouped according to user ID, project ID, organizational or team structures, or the like. By aggregating and storing the source code to be analyzed in a centralized repository, the system may be able to ensure that code quality rules and standards are applied in a uniform manner for all source code created within the network environment.

The process continues to block 304, where the system performs, using an adaptive quality engine, quality pattern analysis on the set of source code. The adaptive quality engine may use one or more machine learning algorithms to analyze the set of source code, where the inputs for machine learning may be the various code quality rules and/or standards as set by the entity. For instance, the adaptive quality engine may use a pattern analyzer algorithm which may be based on k-NN and/or Naïve Bayes algorithms, through which the adaptive quality engine may detect quality gaps or issues within a set of source code based on the code quality rules and standards. By using a machine learning algorithm in this manner, the system provides a code quality analysis method that may be neutral towards various different technology platforms and/or programming languages.

The process continues to block 305, where the system, based on the quality pattern analysis, detects one or more code quality issues within the set of source code. As described above, code quality issues may occur when the code does not conform with certain rules or standards regarding code quality as set by the entity. For example, the entity may wish to set rules with respect to code formatting, syntax, readability, variable names, commenting, performance, consistency, uniformity, and the like. In an exemplary embodiment, the entity may wish to enforce the use of uniform variable names for certain interface elements across multiple projects and/or teams. Accordingly, a code quality issue may be detected by the pattern analyzer upon determining that a source code file within the set of source code contains variable names that are inconsistent with the rules on variable names as set by the entity.

The process concludes at block 306, where the system implements, using a rule imposition engine, one or more resolution steps to remedy the one or more code quality issues within the set of source code. The system may generate a report on the various code quality issues detected within a particular source code file, where the report may comprise the one or more resolution steps. The resolution steps recommended by the system may be based on the type of quality issue detected. For instance, continuing the above example, if the code quality issue detected was inconsistent variable names, the resolutions steps may include renaming the variable names to be consistent with rules on variable names. Accordingly, the master controller may, based on the report of code quality issues, transmit a signal to the code quality bot to automatically implement the resolution steps on the relevant computing systems and source code files according to the corresponding code metadata. In some embodiments, the system may further be configured to transmit an online notification to the user associated with the source code, where the notification indicates that code quality issues detected within the source code as well as the resolution steps that were automatically applied to resolve the code quality issues. Accordingly, the system provides a comprehensive solution to ensuring code quality in the network environment.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for computer program code issue detection and resolution using an automated progressive code quality engine, the system comprising:

a memory device with computer-readable program code stored thereon;

a communication device; and a processing device operatively coupled to the memory device and the communication device, wherein the processing device is configured to execute the computer-readable program code to:

detect, using a code quality bot, that a set of source code is ready for analysis;

receive, from one or more edge devices, the set of source code and metadata associated with the set of source code;

store the set of source code and metadata associated with the set of source code within a compartmentalized raw code database;

perform, using an adaptive quality engine, quality pattern analysis on the set of source code;

based on the quality pattern analysis, detect one or more code quality issues within the set of source code, wherein the one or more code quality issues comprises issues with code formatting, syntax, duplication, or variable names, wherein the quality pattern analysis comprises analyzing the set of source code using a pattern analyzer algorithm, wherein the pattern analyzer algorithm comprises:

a) using a classification algorithm to perform clustering of the set of source code to detect the one or more code quality issues; and b) using a probabilistic algorithm to categorize the one or more code quality issues detected through the classification algorithm; and automatically implement, using a rule imposition engine, one or more resolution steps to remedy the one or more code quality issues within the set of source code, wherein the one or more resolution steps comprises correcting, via the code quality bot, the issues with code formatting, syntax, duplication, or variable names.

2. The system according to claim 1, wherein the code quality bot aggregates, from one or more computing systems, one or more source code files to form the set of source code.

3. The system according to claim 2, wherein the metadata associated with the set of source code comprises a user ID, a system ID, and a project ID for each of the one or more source code files within the set of source code.

4. The system according to claim 1, wherein the quality pattern analysis comprises one or more machine learning algorithms, wherein the adaptive quality engine provides one or more code quality rules as inputs to the one or more machine learning algorithms.

5. The system according to claim 1, wherein the computer-readable program code further causes the processing device to:

identify, based on the metadata associated with the set of source code, one or more users associated with the one or more code quality issues; and transmit, to the one or more users, a notification comprising the one or more code quality issues and the one or more resolution steps.

6. The system according to claim 1, wherein the one or more quality issues comprise at least one of formatting issues, performance issues, and test coverage issues.

7. A computer program product for computer program code issue detection and resolution using an automated progressive code quality engine, the computer program product comprising at least one non-transitory computer readable medium having computer-readable program code portions embodied therein, the computer-readable program code portions comprising executable code portions for:

detecting, using a code quality bot, that a set of source code is ready for analysis;

receiving, from one or more edge devices, the set of source code and metadata associated with the set of source code;

storing the set of source code and metadata associated with the set of source code within a compartmentalized raw code database;

performing, using an adaptive quality engine, quality pattern analysis on the set of source code;

based on the quality pattern analysis, detecting one or more code quality issues within the set of source code, wherein the one or more code quality issues comprises issues with code formatting, syntax, duplication, or variable names, wherein the quality pattern analysis comprises analyzing the set of source code using a pattern analyzer algorithm, wherein the pattern analyzer algorithm comprises:

a) using a classification algorithm to perform clustering of the set of source code to detect the one or more code quality issues; and b) using a probabilistic algorithm to categorize the one or more code quality issues detected through the classification algorithm; and automatically implementing, using a rule imposition engine, one or more resolution steps to remedy the one or more code quality issues within the set of source code, wherein the one or more resolution steps comprises correcting, via the code quality bot, the issues with code formatting, syntax, duplication, or variable names.

8. The computer program product according to claim 7, wherein the code quality bot aggregates, from one or more computing systems, one or more source code files to form the set of source code.

9. The computer program product according to claim 8, wherein the metadata associated with the set of source code comprises a user ID, a system ID, and a project ID for each of the one or more source code files within the set of source code.

10. The computer program product according to claim 7, wherein the quality pattern analysis comprises one or more machine learning algorithms, wherein the adaptive quality engine provides one or more code quality rules as inputs to the one or more machine learning algorithms.

11. The computer program product according to claim 7, wherein the computer-readable program code portions further comprise executable code portions for:

identifying, based on the metadata associated with the set of source code, one or more users associated with the one or more code quality issues; and transmitting, to the one or more users, a notification comprising the one or more code quality issues and the one or more resolution steps.

12. A computer-implemented method for computer program code issue detection and resolution using an automated progressive code quality engine, wherein the method comprises:

detecting, using a code quality bot, that a set of source code is ready for analysis;

receiving, from one or more edge devices, the set of source code and metadata associated with the set of source code;

storing the set of source code and metadata associated with the set of source code within a compartmentalized raw code database;

performing, using an adaptive quality engine, quality pattern analysis on the set of source code;

based on the quality pattern analysis, detecting one or more code quality issues within the set of source code, wherein the one or more code quality issues comprises issues with code formatting, syntax, duplication, or variable names, wherein the quality pattern analysis comprises analyzing the set of source code using a pattern analyzer algorithm, wherein the pattern analyzer algorithm comprises:

a) using a classification algorithm to perform clustering of the set of source code to detect the one or more code quality issues; and b) using a probabilistic algorithm to categorize the one or more code quality issues detected through the classification algorithm; and automatically implementing, using a rule imposition engine, one or more resolution steps to remedy the one or more code quality issues within the set of source code, wherein the one or more resolution steps comprises correcting, via the code quality bot, the issues with code formatting, syntax, duplication, or variable names.

13. The computer-implemented method according to claim 12, wherein the code quality bot aggregates, from one or more computing systems, one or more source code files to form the set of source code.

14. The computer-implemented method according to claim 13, wherein the metadata associated with the set of source code comprises a user ID, a system ID, and a project ID for each of the one or more source code files within the set of source code.

15. The computer-implemented method according to claim 12, wherein the quality pattern analysis comprises one or more machine learning algorithms, wherein the adaptive quality engine provides one or more code quality rules as inputs to the one or more machine learning algorithms.

16. The computer-implemented method according to claim 12, the method further comprising:
    identifying, based on the metadata associated with the set of source code, one or more users associated with the one or more code quality issues; and
    transmitting, to the one or more users, a notification comprising the one or more code quality issues and the one or more resolution steps.

17. The computer-implemented method according to claim 12, wherein the one or more quality issues comprise at least one of formatting issues, performance issues, and test coverage issues.

* * * * *